3,200,101
LOW TEMPERATURE COPOLYMERIZATION
William R. Richard, Jr., and John D. Calfee, Dayton, and Lowell E. Erbaugh, Vandalia, Ohio, assignors to Monsanto Company, a corporation of Delaware
No Drawing. Filed Dec. 30, 1960, Ser. No. 79,501
4 Claims. (Cl. 260—88.2)

The present invention is directed to high pressure, low temperature copolymerization of ethylene with propylene by homogeneous catalysis.

Propylene has been used to some extent to regulate the molecular weight of polyethylenes produced in conventional high temperature, high pressure free-radical catalyzed polymerizations. It has now been found that propylene will serve as a molecular weight depressant and comonomer in low temperature, high pressure polymerizations of ethylene and that the use of small amounts of propylene in low temperature, high pressure polymerizations of ethylene with homogeneous catalysis causes the production of ethylene-propylene copolymers of particular structure and valuable properties.

Ordinary high pressure polyethylene is known to be characterized by a certain degree of chain branching involving a backbone chain and a number of side chains which often contain four or more carbon atoms. This chain branching is often expressed as the ratio of methyl groups per 100 carbon atoms, for every side chain involves the presence of an additional methyl group in the molecule and the presence of methyl groups can be determined from infrared data. The ratio of methyl groups for ordinary commercial polyethylene is 2.6 and molecular weight and viscosity data show most of the branching involves relatively long side chains. When ethylene is homopolymerized, however, at low temperature and high pressure with catalysts such as trialkyl boron in combination with oxygen, the ratio of methyl groups per 100 carbons becomes very small, for example, 0.55 in one case. But when propylene is included along with ethylene in a low temperature, high pressure polymerization with the same catalyst, the copolymerization of the propylene causes the methyl ratio to rise, for example, to 2.8 methyl groups per 100 carbon atoms, the actual ratio, of course, depending upon the proportion of propylene monomers entering the copolymer. In view of the substantial absence of the conventional branching in homopolymer produced under the same conditions, it is apparent that the methyl groups result from the propylene in the copolymer and that the copolymer would be predominantly straight-chain in structure except for the presence of methyl groups as side chains. It will be appreciated that this type of structure will give the polymer valuable properties in a number of respects because the crystallinity resulting from the long, straight-chain backbone structure is interrupted at spaced intervals by methyl groups. Moreover, the methyl groups do not in themselves exhibit crystallization effects, such as are encountered when the side chains are relatively long.

In effecting the present invention, it is necessary to polymerize the ethylene along with substantial amounts of propylene at temperatures below about 60° C. and at pressures above about 20,000 p.s.i. with a free-radical or similar catalyst which is soluble in the monomers or polymerization solvents, and to utilize the catalyst in proper amount to effect polymerization to high molecular weight copolymer at the polymerization temperature employed.

In the present invention it is necessary to use the relatively low polymerization temperatures to produce a copolymer of the desired structure and properties. The amount of undesirable chain branching is fairly small at polymerization temperatures of 60° C. and becomes smaller as the polymerization temperature is lowered below this value, for example, in the range of 20 to 50° C., and even lower polymerization temperatures can be used effectively in the present invention, for example, from those just below room temperature down to the freezing point and even down to extremely low temperatures such as −50° or −60° C. or lower. It will be appreciated, of course, that the use of low polymerization temperatures requires the use of catalysts effective at such polymerization temperatures. In carrying out the present invention it is surprising to find that propylene continues to serve as a molecular weight regulator or depressant even at extremely low polymerization temperatures, as well as entering into the copolymerization. The use of low temperatures in the present invention is further advantageous in that it greatly reduces long chain branching and also causes the production of higher density polymer with accompanying increase in tensile strength, stiffness, melting point, and other properties.

In view of the depressant effect of the propylene on the polymerization, it is necessary to use very high pressure in the present process in order to obtain high molecular weight polymer having good tensile strength, namely, pressures of at least 20,000 p.s.i. and preferably pressures of 25,000 p.s.i. to 35,000 p.s.i. or 40,000 p.s.i. or higher.

In one particular aspect, the present invention concerns copolymerizing ethylene and propylene employing as catalysts hydrides of boron and hydrocarbon derivatives of boron in combination with oxygen. As the boron catalyst components which can be employed in the present invention completely inorganic hydrides of boron containing only hydrogen and boron atoms are included, as well as hydrocarbon derivatives of boron and boron hydrides, such as alkyl borons, cycloalkyl borons, aryl borons, alkyl borohydrides, cycloalkyl borohydrides, aryl borohydrides, and the like. As trialkyl borons which can be employed as catalyst components in the present invention, any trialkyl boron is contemplated as applicable, particularly in which the alkyl groups have 1 to 10 or more carbon atoms and have a normal or forked chain, or cyclic structures. While trialkylboranes in which all of the alkyl groups are the same will ordinarily be employed for convenience, those containing 2 or 3 different alkyls are also suitable as are mixtures of 2 or more different trialkylboranes. A few of the specific alkylboranes which are suitable are, for example, triethylborane, trimethylborane, tri-n-propylboranes, triisopropylborane, triisobutylborane, tri-n-butylborane, tri-n-hexylborane, tri-n-butylborane, tri-n-hexylborane, tri-n-octylborane, butyldiethylborane, tricyclohexylborane, tridecylborane, and the like. Examples of arylboranes include triphenylborane, tritolylborane, p-xylylborane, trinaphthylborane and the like. As completely inorganic hydrides useful as a boron hydride in the present invention, representative relatively stable compounds are diborane ($B_2H_6$), pentaborane ($B_5H_9$), hexylborane ($B_6H_{10}$), and decaborane ($B_{10}H_{14}$), but other less stable hydrides of boron such as $BH_3$, $B_4H_{10}$, $B_5H_{11}$, and $B_6H_{12}$ which readily decompose to various polymeric hydrides of boron can also be employed, as can various homologues and analogs of the foregoing, particularly those having from 1 to 10 or so boron atoms.

Mixtures of the hydrides of boron and the hydrocarbon derivatives of boron can be employed as a catalyst component in the present invention. Moreover, mixed hydride-hydrocarbon derivatives of boron can be employed as represented, for example, by any of the foregoing hydrides of boron in which at least one but not all of the hydrogens have been replaced by hydrocarbon groups, for example, by aryl or alkyl groups such as phenyl or methyl groups, or by any of the other groups set forth above in the examples of hydrocarbon derivatives of boron. A few such representative boron hydrides which are suitable, are, for example, diethylhydroborane, dihydroethylborane, dihydromethylborane, dimethyldiborane, ethyldiborane, dihydro-n-propylborane, dihydroisopropylborane, butyldihydroborane, dioctylhydroborane, dihydrophenylborane, as well as other alkyl, cycloalkyl, aryl, etc., hydroboranes. It may well be that alkylhydroboranes are produced in situ in the reaction of olefinic monomers with the boron hydride, $B_xH_y$, as for example, when $B_2H_6$ is contacted with ethylene in the present process in the presence of oxygen and the use of such alkylhydroboranes is contemplated as within the invention whether added as such or produced in situ.

One particular group of the boron catalyst components suitable for use in the present invention can be presented by the formula:

$$BR_3$$

in which R represents hydrogen, alkyl, aryl, or cycloalkyl, and the individual R's can be the same or different.

The oxygen catalyst component employed when boron catalysts are used in the present invention will generally be free oxygen, oxygen in air, or oxygen in admixture with other gases or with ethylene; however, it is possible and sometimes advantageous to employ other oxygen-containing or oxygen-generating compounds as catalyst adjuvants. The oxygen or peroxygen compounds suitable as oxygen component of the boron initiator are, for example, oxygen, either added as such or generated in situ by addition of oxygen-generating compounds, and including oxygen added as a component of gases such as air, and peroxygen compounds, particularly organic peroxygen compounds, capable of generating free radicals when heated below 200° C. such as hydrogen peroxide, dicumylperoxide, benzoylperoxide, laurylperoxide, diethylperoxide, ditertiarylbutylperoxide, diisopropylperoxide, hydroxymethylperoxide, tertiarylbutylhydroperoxide, ethylhydroperoxide, acetyl peracid, benzo peracid, succinic mono peracid, phthalic peracid, trimethylaceto peracid, ethylpercaproate, ethylperbenzoate, tertiarybutylperbenzoate, etc. and any other peroxide or peroxygen compounds capable of employment as free radical polymerization catalysts. While the description herein of the use of boron catalysts will be primarily directed to the use of oxygen itself as a catalyst component, it will be realized that the description is pertinent to the oxygen catalyst adjuvants in general, it only being necessary for the most part to substitute equimolar amounts of organic or other peroxygen compounds for oxygen in any procedure.

It will be realized that the hydrides of boron or hydrocarbon derivatives of boron employed in combination with oxygen or peroxygen compounds are effective initiators for interpolymerization of ethylene and propylene without the necessity for any other metal salts or compounds and that the presence of other metal salts such as $TiCl_4$ and the like while permissible, is not required and in some cases might even be deleterious to the free radical catalyzed polymerization; i.e., in one preferred embodiment it is contemplated that a hydride of boron or hydrocarbon derivative of boron be the sole metal compound employed in the polymerization.

In addition to the boron-containing catalysts discussed above, any free radical catalyst capable of initiating ethylene polymerization at temperatures below 60° C. can be employed in the process of the present invention. It will be recognized that the free radical catalysts utilized herein are soluble catalysts suitable for use as homogeneous catalysts, i.e., in polymerizations occurring in a single phase, as contrasted with insoluble catalysts such as those heterogeneous catalysts involving metal alkyls in combination with heavy metal salts. The free radical catalysts suitable for use in the present invention are in general those capable of generating free radicals at temperatures below 60° C., for example, acetyl benzoyl peroxide, peracetic acid, hydroxyheptyl peroxide, diisobutyryl peroxide, dipavalyl peroxide or other α-substituted acyl peroxides, isopropyl percarbonate, methyl ethyl ketone peroxide, cyclohexanone peroxide, cyclohexyl hydroperoxide, 2,4-dichlorobenzoyl peroxide, cumene hydroperoxide, diethyl peroxydicarbonate or other peroxydicarbonate esters, and other peroxide or related catalysts effective in the 30° to 50° C. range, or alkyl and aryl hyponitrites, e.g., methyl ethyl, isobutyl, and benzyl hyponitrites effective at temperatures of 15°–50° C. [Seed, 2,839,519], certain alpha, alpha′-azo-bis-isoalkyl nitriles effective at temperature of 35° to 60° C., for example, 2,2′-azo-bis-2,4-dimethylvaleronitrile, and alpha,alpha′-azodiisobutyronitrile [Larchar, 2,816,883]; and various other catalysts which provide free radicals at a desirable rate at temperatures below 60° C.

The present invention is illustrated by the following examples:

*Example 1*

Triethylborane, about 0.1 cc., 10 grams of benzene, and 15 grams propylene were charged to a 250 cc. autoclave which was then heated to 40° C. and pressured to about 15,000 p.s.i. with ethylene. Then ethylene containing 0.1% by weight oxygen was pumped in until a pressure of 25,000 p.s.i. was attained while the internal reactor temperature was maintained at about 40° C., and additional ethylene was added as necessary to maintain the pressure during the polymerization (a total of about 135 grams ethylene being provided). A total of about 0.02 gram oxygen was employed. During a polymerization time of 13 minutes, a yield of 3 grams solid copolymer was obtained. The copolymer was milled to remove residual solvent and monomer and molded into a smooth film having good tensile strength. By infrared analysis, it was found that the copolymer had 2.81 methyl groups per 100 carbon atoms.

*Example 2*

A polymerization was run according to the procedure of Example 1, but employing 0.2 cc. triethylborane and 0.04 gram oxygen, to produce 8 grams of solid ethylene/propylene copolymer in a reaction time of 13 minutes.

*Example 3*

The procedure of Example 1 was repeated, but employing 0.5 cc. triethylborane and 0.1 gram oxygen to obtain 12 grams of solid ethylene/propylene copolymer.

*Example 4*

A copolymerization was conducted at −5° C. and 30,000 p.s.i. of ethylene with 0.3 gram triethylborane, 0.01 gram oxygen and 15 grams propylene in 10 grams hexane. In four hours, 11 grams of solid ethylene/propylene copolymer was obtained, density 0.9388, specific viscosity 0.057 (0.1% in xylene at 105° C.).

*Example 5*

A copolymerization was conducted as in Example 4, but at a temperature of −60° C. for 6 hours, and utilizing 0.007 gram oxygen, to obtain a small amount of ethylene/propylene copolymer.

When polymerizations were conducted at −10° to −55° C. utilizing ethylene but no propylene, larger amounts of polymer product were obtained, thus indicating that propylene retards the polymerization even at these low temperatures.

Regulating the rate of addition of the oxygen is an effective control method where boron and oxygen catalysts are used herein. Thus, in the presence of sufficient amounts of boron hydride or hydrocarbon derivatives of boron catalyst to effect the rapid, uncontrolled polymerization of the ethylene if uncontrolled amounts of oxygen were immediately added, it is possible to so control the oxygen addition as to effect an efficient, reasonably rapid conversion of the ethylene and propylene to high molecular weight copolymer, without having so much oxygen as to make it impossible to dissipate the heat of the exothermic polymerization thereby causing undue rises in the reaction temperature and resulting deterioration or carbonization of the product. For example, the oxygen can be added at rates sufficient to avoid temperature in excess of 60° C. for any substantial part of the polymerization cycle. The controlled addition of the oxygen will be especially advantageous when relatively high amounts of the boron component are employed, although the effectiveness of heat transfer systems and other factors will have a considerable influence upon the advantage of carefully controlled oxygen addition. The regulated addition of oxygen will also provide a method of effecting good control of polymerization temperature, making it possible to conduct almost the entire polymerization within a certain range of a particular temperature, for example, 0° C., with consequent uniformity of product.

The polymerization according to the present invention can occur in bulk, in aqueous or non-aqueous emulsion, or in solution in hydrocarbon or other organic solvents and the like, it can also occur in gaseous or vapor phase. It is especially notable in the case of bulk polymerization that the interpolymerization according to the present invention can be effected at low temperature.

It is generally advantageous when employing boron and oxygen catalysts in the present invention to have at least about one-half of the total amount of oxygen catalyst employed added after the pressure has been raised to 10,000 p.s.i. or greater, and preferably at least about three-fourths of the oxygen catalyst added after such pressures have been attained.

The amount of boron hydride or hydrocarbon derivatives of boron catalyst can vary considerably, for example, from less than 0.0001% up to 2% or more by weight of the polymerizable monomers, the amounts within these ranges being so chosen that the polymerization will proceed at acceptable rates, and also so that the polymerization can be controlled under the conditions and with the apparatus employed. In general, the hydrocarbon derivatives of boron are less reactive than the hydrides of boron, and the hydrocarbon derivatives will ordinarily be employed in amounts from less than about 0.1% to 2% by weight of the polymerizable monomers, but higher amounts up to 5% or more can be employed. The oxygen catalyst component will generally be added in percentages similar to the particular boron compound components, and will also be added in amounts or at a rate such that the polymerization proceeds at the desired rate, for example, in the case of the hydrocarbon derivatives of boron, such as trialkylboranes, oxygen or peroxygen catalysts are suitably employed in amounts which are approximately equimolar, although smaller amounts from a trace of oxygen upward are effective to some extent but conversion rates are undesirably slow; amounts of oxygen in the range of 0.5 to 1.5 moles of hydrocarbon derivatives of boron, such as trialkylboranes, will ordinarily be very suitable.

The total amounts of oxygen or peroxygen catalyst compound employed in combination with boron catalysts in the process can vary considerably; for example, the total amount of oxygen will often be in the range from about less than 1 part by weight to 50 or so parts by weight, based on a million parts by weight of polymerizable monomers, the actual amount depending to a considerable extent upon the type and amount of boron catalyst component employed. With the hydrocarbon derivatives of boron as the boron catalyst component, the total amounts of oxygen will generally be in the range from about 5 parts by weight to 50 or so parts by weight, based on a million parts by weight of polymerizable monomers; when effecting an interpolymerization with this catalyst system, it is desirable that the ethylene originally charged contain less than 5 weight per million of oxygen.

When employing other free radical catalysts in the present invention, the catalysts will be employed in amounts generally used in the art, e.g., between about 0.001 and about 1% by weight based on the weight of monomer charge.

With the present method involving use of propylene as a polymerization regulator, it is not necessary to employ other chain transfer agents, such as alkanes of 3 to 6 carbon atoms, ketones, aldehydes, and the like, to control the polymerization, but the use of such agents may have certain advantages.

The present invention will be useful in obtaining ethylene/propylene copolymers characterized by minimal presence of long-chain branches, and involving various amounts of propylene, depending upon the properties of the copolymer; small amounts of propylene, for example, for 0.1 to 5% by weight or so present as polymerizate in the copolymer will give some desirable modification in properties, while larger amounts, such as 10% to 20% or more by weight will involve a further change from the properties of polyethylene homopolymer. The ethylene/propylene copolymers as produced in the present invention will have high resistance to stress cracking due to the methyl side chains and the absence of long side chains.

What is claimed is:

1. The method of conducting a mass interpolymerization of ethylene and propylene to obtain clear ethylene/propylene interpolymer which comprises contacting ethylene, propylene, and a triethyl boron under high pressure and injecting oxygen into the contacted materials and permitting polymerization at low temperature.

2. The method of claim 1 in which the triethyl boron is employed in amounts from 0.01% to 2% by weight based on polymerizable monomer and oxygen is employed in amounts from 5 to 50 parts per million by weight based on polymerizable monomer.

3. The method of preparing ethylene/propylene interpolymer which comprises polymerizing ethylene and propylene with triethyl boron in the presence of oxygen catalyst.

4. The method of claim 3 in which the polymerization occurs at temperatures no greater than about 60° C.

References Cited by the Examiner

UNITED STATES PATENTS

| | | | |
|---|---|---|---|
| 2,825,721 | 3/51 | Hogan et al. | 260—88.1 |
| 2,865,575 | 8/54 | Heiligman et al. | 260—83.7 |
| 2,985,633 | 5/61 | Welch | 260—85.3 |
| 3,061,603 | 10/62 | Calfee et al. | 260—88.2 |

OTHER REFERENCES

Furukawa et al.: J. Poly. Sci., vol. 28, pp. 227–28 (February 1958).

Renfrew: Polythene, Interscience, N.Y., (1960), p. 94.

JOSEPH L. SCHOFER, *Primary Examiner.*

L. H. GASTON, WILLIAM H. SHORT, *Examiners.*